(12) United States Patent
Lesso

(10) Patent No.: US 11,488,583 B2
(45) Date of Patent: Nov. 1, 2022

(54) DETECTION OF SPEECH

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

(*) Notice: Subject to any disclaimer, the term of this patent is extended or adjusted under 35 U.S.C. 154(b) by 107 days.

(21) Appl. No.: 16/876,373

(22) Filed: May 18, 2020

(65) Prior Publication Data

US 2020/0380955 A1 Dec. 3, 2020

Related U.S. Application Data

(60) Provisional application No. 62/854,388, filed on May 30, 2019.

(51) Int. Cl.
| | | |
|---|---|---|
| *G06F 21/32* | (2013.01) | |
| *G10L 15/07* | (2013.01) | |
| *G06F 1/16* | (2006.01) | |
| *G10L 15/28* | (2013.01) | |

(52) U.S. Cl.
CPC .............. *G10L 15/07* (2013.01); *G06F 1/163* (2013.01); *G10L 15/28* (2013.01)

(58) Field of Classification Search
None
See application file for complete search history.

(56) References Cited

U.S. PATENT DOCUMENTS

| | | | | |
|---|---|---|---|---|
| 5,933,506 A | * | 8/1999 | Aoki | H04R 1/46 381/151 |
| 6,964,642 B2 | * | 11/2005 | Wasden | A61B 5/12 600/559 |
| 7,676,372 B1 | * | 3/2010 | Oba | G10L 21/0364 704/271 |
| 10,455,324 B2 | * | 10/2019 | Klemme | G10L 25/78 |
| 10,535,364 B1 | * | 1/2020 | Zhong | H04R 1/02 |
| 10,904,676 B2 | * | 1/2021 | Lim | H04R 25/606 |
| 2006/0239468 A1 | * | 10/2006 | Desloge | H04R 25/30 381/60 |

(Continued)

OTHER PUBLICATIONS

International Search Report and Written Opinion of the International Searching Authority, International Application No. PCT/GB2020/051270, dated Aug. 3, 2020.

*Primary Examiner* — Jakieda R Jackson
(74) *Attorney, Agent, or Firm* — Jackson Walker L.L.P.

(57) ABSTRACT

A method of own voice detection is provided for a user of a device. A first signal is detected, representing air-conducted speech using a first microphone of the device. A second signal is detected, representing bone-conducted speech using a bone-conduction sensor of the device. The first signal is filtered to obtain a component of the first signal at a speech articulation rate, and the second signal is filtered to obtain a component of the second signal at the speech articulation rate. The component of the first signal at the speech articulation rate and the component of the second signal at the speech articulation rate are compared, and it is determined that the speech has not been generated by the user of the device, if a difference between the component of the first signal at the speech articulation rate and the component of the second signal at the speech articulation rate exceeds a threshold value.

20 Claims, 10 Drawing Sheets

(56) References Cited

U.S. PATENT DOCUMENTS

| | | | |
|---|---|---|---|
| 2010/0040249 A1* | 2/2010 | Lenhardt | H04R 25/502 |
| | | | 381/316 |
| 2013/0246059 A1* | 9/2013 | Kechichian | G10L 21/0208 |
| | | | 704/226 |
| 2015/0036856 A1* | 2/2015 | Pruthi | H04R 25/505 |
| | | | 381/317 |
| 2019/0005964 A1 | 1/2019 | Lesso | |
| 2019/0043518 A1 | 2/2019 | Li | |
| 2019/0074012 A1* | 3/2019 | Kapur | A61B 5/682 |
| 2019/0075406 A1 | 3/2019 | Petersen et al. | |

* cited by examiner

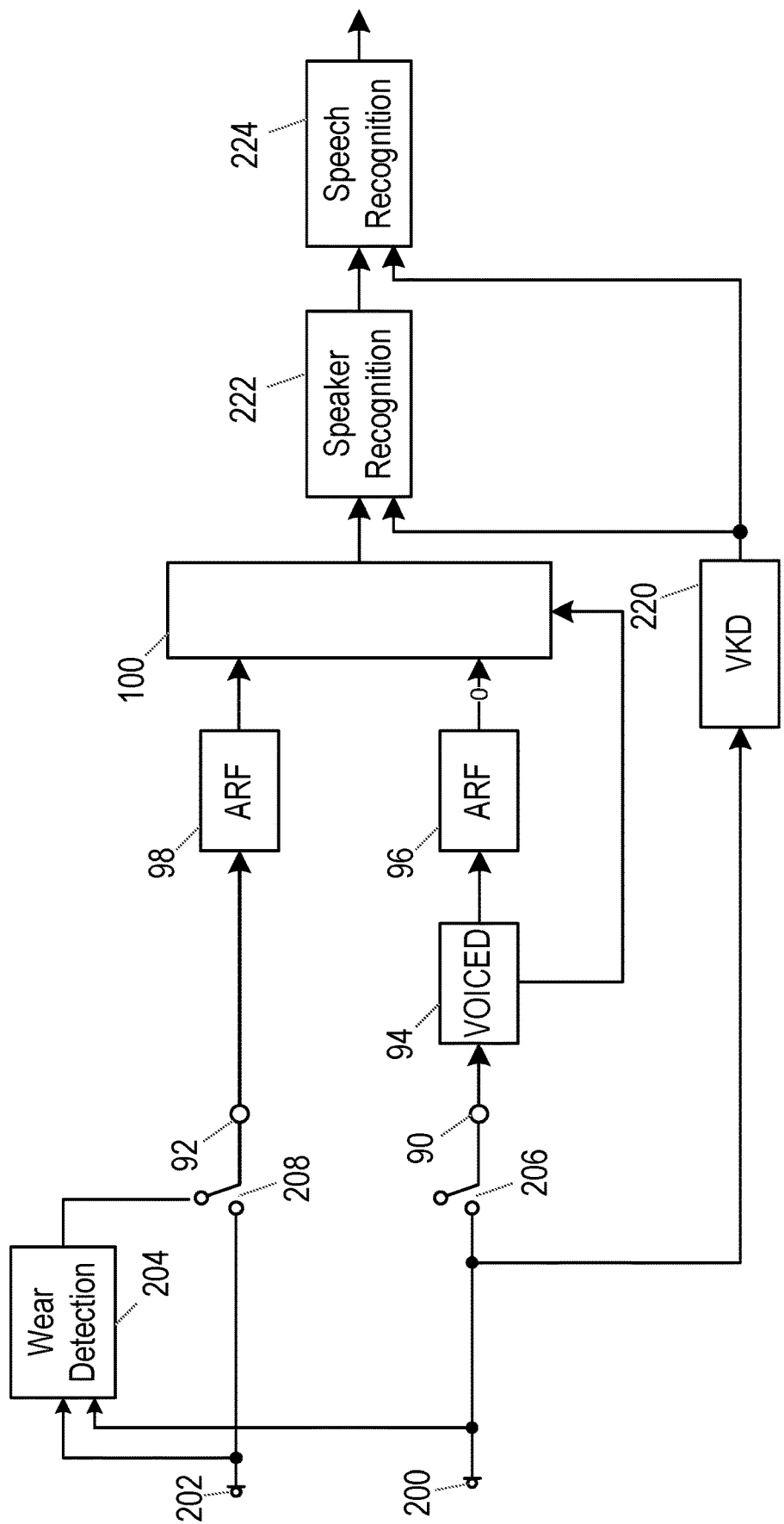

DETECTION OF SPEECH

TECHNICAL FIELD

This relates to the detection of speech, and in particular to detecting when a speaker is a person who is using a device, for example wearing a wearable accessory such as an earphone.

BACKGROUND OF THE INVENTION

Wearable accessories, such as earphones, smart glasses and smart watches, are common. There are situations in which it is desirable to know whether the person speaking, when speech is detected, was the person wearing a particular accessory. For example, when an accessory is being used in connection with a device such as a smartphone that has speech recognition functionality, it is useful to know whether detected speech was spoken by the person wearing the accessory. In that case, speech that was spoken by the person wearing the accessory can be supplied to the speech recognition functionality so that any spoken commands can be acted upon, while speech that was not spoken by the person wearing the accessory can be ignored in some circumstances.

SUMMARY OF THE INVENTION

According to the embodiments described herein, there is provided a method and a system which reduce or avoid one or more of the disadvantages mentioned above.

According to a first aspect of the invention, there is provided a method of own voice detection for a user of a device, the method comprising:
  detecting a first signal representing air-conducted speech using a first microphone of the device;
  detecting a second signal representing bone-conducted speech using a bone-conduction sensor of the device;
  filtering the first signal to obtain a component of the first signal at a speech articulation rate;
  filtering the second signal to obtain a component of the second signal at the speech articulation rate;
  comparing the component of the first signal at the speech articulation rate and the component of the second signal at the speech articulation rate; and
  determining that the speech has not been generated by the user of the device, if a difference between the component of the first signal at the speech articulation rate and the component of the second signal at the speech articulation rate exceeds a threshold value.

According to a second aspect of the invention, there is provided a system, for own voice detection for a user of a device, the system comprising:
  an input for receiving a first signal representing air-conducted speech from a first microphone of the device and a second signal representing bone-conducted speech from a bone-conduction sensor of the device;
  at least one filter for filtering the first signal to obtain a component of the first signal at a speech articulation rate and for filtering the second signal to obtain a component of the second signal at the speech articulation rate;
  a comparator for comparing the component of the first signal at the speech articulation rate and the component of the second signal at the speech articulation rate; and
  a processor for determining that the speech has not been generated by the user of the device, if a difference between the component of the first signal at the speech articulation rate and the component of the second signal at the speech articulation rate exceeds a threshold value.

According to a third aspect of the invention, there is provided a method of detecting a spoof attack on a speaker recognition system, the method comprising:
  detecting a first signal representing air-conducted speech using a first microphone of a device;
  detecting a second signal representing bone-conducted speech using a bone-conduction sensor of the device;
  filtering the first signal to obtain a component of the first signal at a speech articulation rate;
  filtering the second signal to obtain a component of the second signal at the speech articulation rate;
  comparing the component of the first signal at the speech articulation rate and the component of the second signal at the speech articulation rate;
  determining that the speech has not been generated by a user of the device, if a difference between the component of the first signal at the speech articulation rate and the component of the second signal at the speech articulation rate exceeds a threshold value; and
  performing speaker recognition on the first signal representing speech, if the difference between the component of the first signal at the articulation rate and the component of the second signal at the articulation rate does not exceed the threshold value.

The method may further comprise:
determining whether the device is being worn or held, and performing at least the step of comparing the component of the first signal at the speech articulation rate and the component of the second signal at the speech articulation rate only if it is determined that the device is being worn or held.

The method may further comprise:
performing voice keyword detection on the first signal representing speech; and
performing speaker recognition on the first signal representing speech only if a predetermined voice keyword is detected in the first signal representing speech.

The method may further comprise:
if the result of performing speaker recognition is a determination that the speech was generated by an enrolled user, performing speech recognition on the first signal representing speech.

The device may be a wearable device, in which case the user of the device is a wearer of the device. The wearable device may be an earphone, smart glasses, or a smart watch. Alternatively, the device may be a handheld device. The handheld device may be a mobile phone.

According to a fourth aspect of the invention, there is provided a speaker recognition system, comprising:
  an input for receiving a first signal representing air-conducted speech from a first microphone of a device and a second signal representing bone-conducted speech from a bone-conduction sensor of the device;
  at least one filter for filtering the first signal to obtain a component of the first signal at a speech articulation rate, and for filtering the second signal to obtain a component of the second signal at the speech articulation rate;
  a comparator for comparing the component of the first signal at the speech articulation rate and the component of the second signal at the speech articulation rate;
  a processor for determining that the speech has not been generated by a user of the device, if a difference between the component of the first signal at the speech articulation rate and the component of the second signal at the speech articulation rate exceeds a threshold value; and a speaker recognition block, for performing speaker recognition on the first signal representing speech, if the difference between the component of the first signal at the articulation rate and the component of the second signal at the articulation rate does not exceed the threshold value.

The system may further comprise:

a detection circuit for determining whether the device is being worn or held, wherein the system is configured for performing at least the step of comparing the component of the first signal at the speech articulation rate and the component of the second signal at the speech articulation rate only if it is determined that the device is being worn or held.

The system may further comprise:

a voice keyword detection block, for receiving the first signal representing speech, wherein the system is configured for performing speaker recognition on the first signal representing speech only if a predetermined voice keyword is detected in the first signal representing speech.

The system may be configured for performing speech recognition on the first signal representing speech, if the result of performing speaker recognition is a determination that the speech was generated by an enrolled user.

The device may be a wearable device, and the user of the device may be a wearer of the device. The wearable device may be an earphone, smart glasses, or a smart watch.

The device may be a handheld device. The handheld device may be a mobile phone.

BRIEF DESCRIPTION OF THE DRAWINGS

For a better understanding of the invention, and to show more clearly how it may be carried into effect, reference will now be made, by way of example only, to the accompanying drawings in which:

FIG. 13 is a block diagram, illustrating an alternative form of system as described herein.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

For clarity, it will be noted here that this description refers to speaker recognition and to speech recognition, which are intended to have different meanings. Speaker recognition refers to a technique that provides information about the identity of a person speaking. For example, speaker recognition may determine the identity of a speaker, from amongst a group of previously registered individuals, or may provide information indicating whether a speaker is or is not a particular individual, for the purposes of identification or authentication. Speech recognition refers to a technique for determining the content and/or the meaning of what is spoken, rather than recognising the person speaking.

Figure 1:
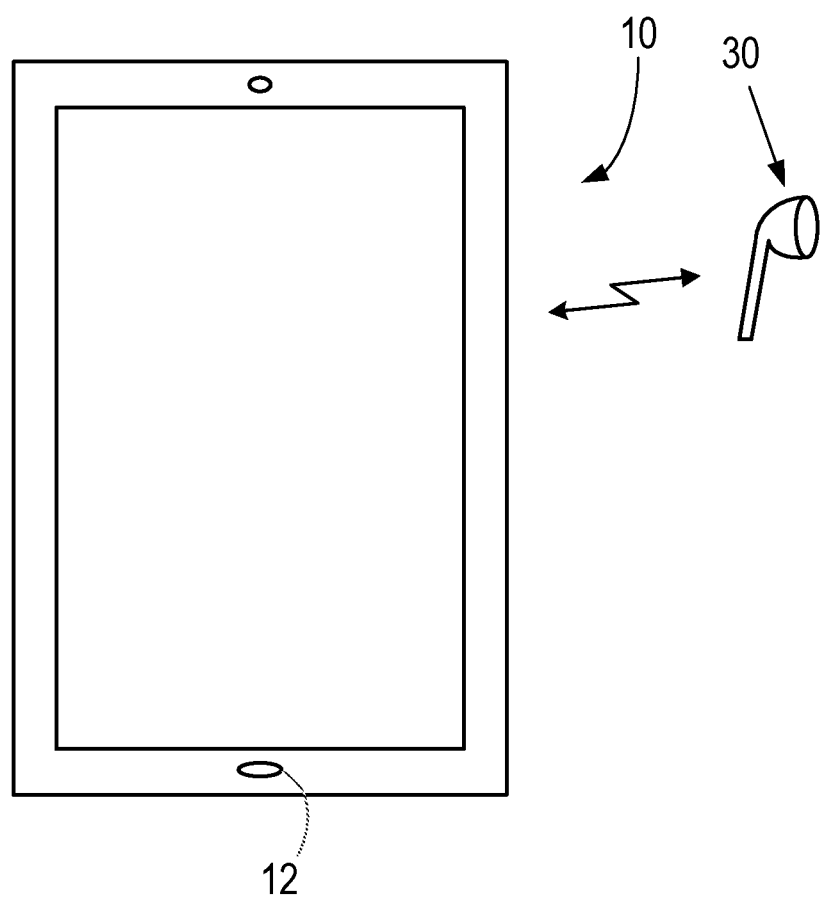
FIG. 1 is a schematic view of an electronic device and an associated accessory.

FIG. 1 shows a device in accordance with one aspect of the invention. The device may be any suitable type of device, such as a mobile computing device, for example a laptop or tablet computer, a games console, a remote control device, a home automation controller or a domestic appliance including a domestic temperature or lighting control system, a toy, a machine such as a robot, an audio player, a video player, or the like, but in this illustrative example the device is a mobile telephone, and specifically a smartphone 10, having a microphone 12 for detecting sounds. The smartphone 10 may, by suitable software, be used as the control interface for controlling any other further device or system.

FIG. 1 also shows an accessory, which in this case is a wireless earphone 30, which in this example takes the form of an in-ear earphone or an earbud. The earphone 30 may be one of a pair of earphones or a part of a headset, or may be used on its own. A wireless earphone 30 is shown, but an earphone with a wired connection to the device may equally be used. The accessory may be any suitable device that can be worn by a person and used in conjunction with the device. For example, the accessory may be a smart watch, or a pair of smart glasses.

Figure 2:
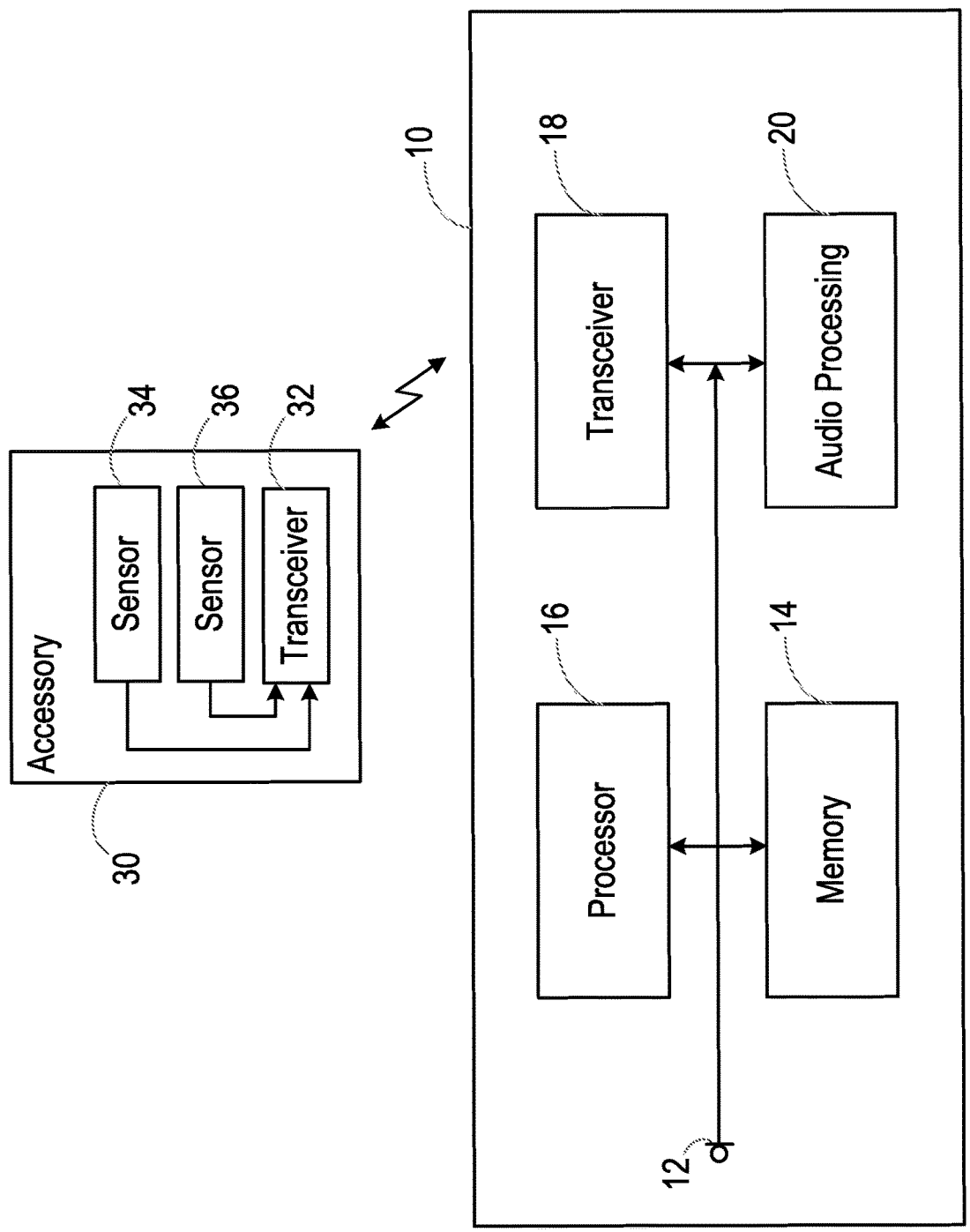
FIG. 2 is a further schematic diagram of an electronic device and an accessory.

FIG. 2 is a schematic diagram, illustrating the form of the smartphone 10 and the wireless earphone 30.

Specifically, FIG. 2 shows various interconnected components of the smartphone 10 and the wireless earphone 30. It will be appreciated that the smartphone 10 and the wireless earphone 30 will in practice contain many other components, but the following description is sufficient for an understanding of the present invention. In addition, it will be appreciated that similar components to those shown in FIG. 2 may be included in any suitable device and any suitable wearable accessory.

Thus, FIG. 2 shows that the smartphone 10 includes the microphone 12 mentioned above.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

Thus, the memory 14 may act as a tangible computer-readable medium, storing code, for causing the processor 16 to perform methods as described below.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

In addition, the transceiver 18 allows the smartphone 10 to communicate with the wireless earphone 30, for example using Bluetooth or another short-range wireless communications protocol.

FIG. 2 also shows audio processing circuitry 20, for performing operations on the audio signals detected by the microphone 12 as required. For example, the audio processing circuitry 20 may filter the audio signals or perform other signal processing operations.

FIG. 2 shows that the wireless earphone 30 includes a transceiver 32, which allows the wireless earphone 30 to communicate with the smartphone 10, for example using Bluetooth or another short-range wireless communications protocol.

FIG. 2 also shows that the wireless earphone 30 includes a first sensor 34 and a second sensor 36, which will be described in more detail below. Signals that are generated by the first sensor 34 and the second sensor 36, in response to external stimuli, are transmitted to the smartphone 10 by means of the transceiver 32.

Thus, in this illustrated embodiment, signals are generated by sensors on an accessory, and these signals are transmitted to a host device, where they are processed. In other embodiments, the signals are processed on the accessory itself.

In this embodiment, the smartphone 10 is provided with speaker recognition functionality, and with control functionality. Thus, the smartphone 10 is able to perform various functions in response to spoken commands from an enrolled user. The speaker recognition functionality is able to distinguish between spoken commands from an enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the speaker recognition functionality is performed in the device that is intended to carry out the spoken command. Certain other embodiments relate to systems in which the speaker recognition functionality is performed on a smartphone or other device, which then transmits the commands to a separate device if the speaker recognition functionality is able to confirm that the speaker was an enrolled user.

In some embodiments, while speaker recognition functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

When a spoken command is received, it is often required to perform a process of speaker verification, in order to confirm that the speaker is an enrolled user of the system. It is known to perform speaker verification by first performing a process of enrolling a user to obtain a model of the user's speech. Then, when it is desired to determine whether a particular test input is the speech of that user, a first score is obtained by comparing the test input against the model of the user's speech. In addition, a process of score normalization may be performed. For example, the test input may also be compared against a plurality of models of speech obtained from a plurality of other speakers. These comparisons give a plurality of cohort scores, and statistics can be obtained describing the plurality of cohort scores. The first score can then be normalized using the statistics to obtain a normalized score, and the normalised score can be used for speaker verification.

In embodiments described herein, it can be determined whether detected speech was spoken by the person wearing the earphone 30. This is referred to as "own voice detection". If it is determined that the detected speech was spoken by the person wearing the earphone 30, the speech signal may be sent for speaker recognition and/or speech recognition. If it is determined that the detected speech was not spoken by the person wearing the earphone 30, a decision may be taken that the speech signal should not be sent for speaker recognition and/or speech recognition.

Figure 3:
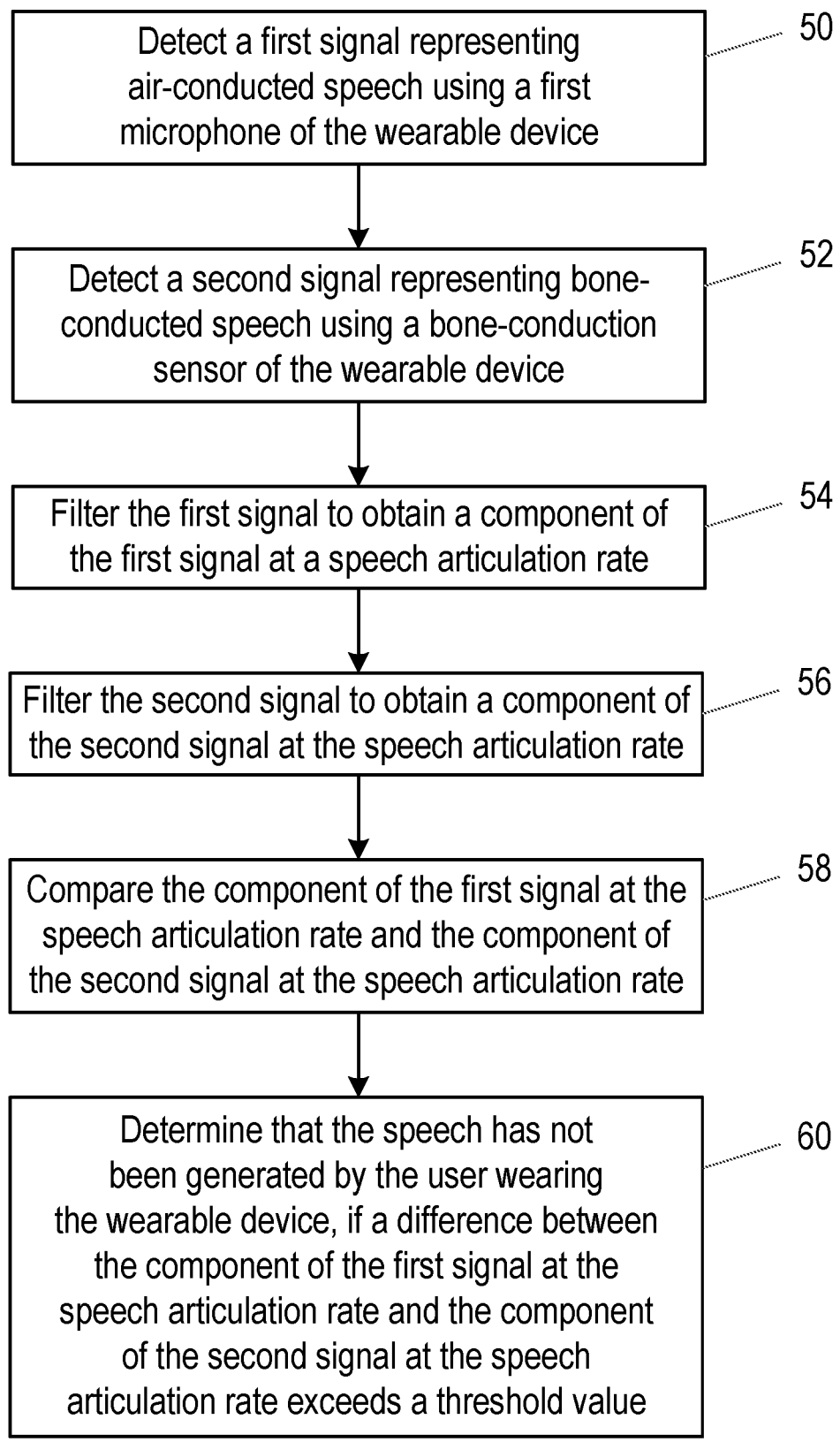
FIG. 3 is a flow chart, illustrating a method.

FIG. 3 is a flow chart illustrating an example of a method in accordance with the present disclosure, and specifically a method for own voice detection for a user wearing a wearable device, that is, a method for detecting whether the person wearing the wearable device is the person speaking.

Essentially the same method can be used for detecting whether a person holding a handheld device such as a mobile phone is the person speaking.

Figure 4:
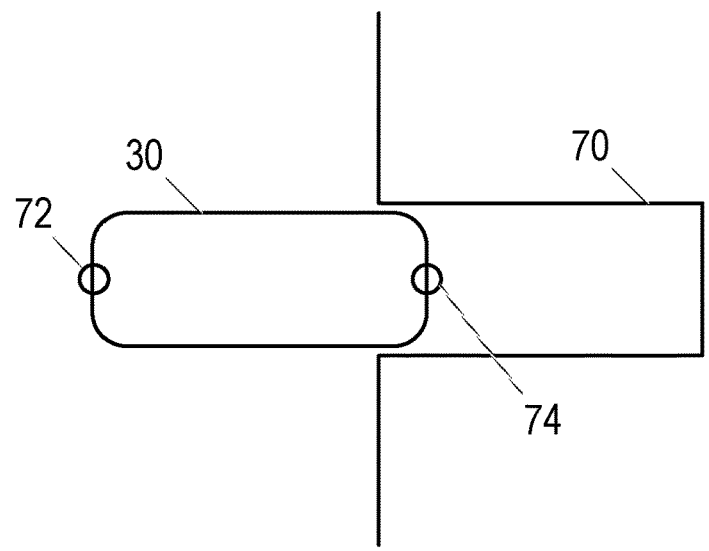
FIG. 4 illustrates a wearable device.

FIG. 4 illustrates in more detail the form of the wearable device, in one embodiment. Specifically, FIG. 4 shows the earphone 30 being worn in the ear canal 70 of a wearer.

In this example, the first sensor 34 shown in FIG. 2 takes the form of an out-of-ear microphone 72, that is, a microphone that detects acoustic signals in the air surrounding the wearer's ear. In this example, the second sensor 36 shown in FIG. 2 takes the form of a bone-conduction sensor 74. This may be an in-ear microphone that is able to detect acoustic signals in the wearer's ear canal, that result from the wearer's speech and that are transmitted through the bones of the wearer's head, and that may also be able to detect vibrations of the wearer's ear canal itself. Alternatively, the bone-conduction sensor 74 may be an accelerometer, positioned such that it is in contact with the wearer's ear canal, and can detect contact vibrations that result from the wearer's speech and that are transmitted through the bones and/or soft tissue of the wearer's head.

Similarly, if the wearable device is a pair of smart glasses, the first sensor may take the form of an externally directed microphone that picks up the wearer's speech (and other sounds) by means of conduction through the air, and the second sensor may take the form of an accelerometer that is positioned to be in contact with the wearer's head, and can detect contact vibrations that result from the wearer's speech and that are transmitted through the bones and/or soft tissue of the wearer's head.

Similarly, if the wearable device is a smart watch, the first sensor may take the form of an externally directed microphone that picks up the wearer's speech (and other sounds) by means of conduction through the air, and the second sensor may take the form of an accelerometer that is positioned to be in contact with the wearer's wrist, and can detect contact vibrations that result from the wearer's speech and that are transmitted through the wearer's bones and/or soft tissue.

If the method is used for detecting whether a person holding a handheld device such as a mobile phone is the person speaking, the first sensor may be the microphone 12 that picks up the wearer's speech (and other sounds) by means of conduction through the air, and the second sensor may take the form of an accelerometer that is positioned within the handheld device (and therefore not visible in FIG. 1), that can detect contact vibrations that result from the user's speech and that are transmitted through the wearer's bones and/or soft tissue. When the handheld device is being pressed against the user's head, the accelerometer can detect contact vibrations that result from the wearer's speech and that are transmitted through the bones and/or soft tissue of the user's head, while, when the handheld device is not being pressed against the user's head, the accelerometer can detect contact vibrations that result from the wearer's speech and that are transmitted through the bones and/or soft tissue of the user's arm and hand.

In step 50 of FIG. 3, the method then comprises detecting a first signal representing air-conducted speech using the first microphone 72 of the wearable device 30. That is, when the wearer speaks, the sound leaves their mouth and travels through the air, and can be detected by the microphone 72.

In step 52 of FIG. 3, the method also comprises detecting a second signal representing bone-conducted speech using the bone-conduction sensor 74 of the wearable device 30. That is, when the wearer speaks, the vibrations are conducted through the bones of their head (and/or may be conducted to at least some extent through the surrounding soft tissue), and can be detected by the bone-conduction sensor 74.

In principle, the process of own voice detection can be achieved by comparing the signals generated by the microphone 72 and the bone-conduction sensor 74.

However, since a typical bone-conduction sensor 74 is based on an accelerometer, and accelerometers typically run at a low sample rate, for example in the region of 100 Hz-1 kHz, the signal generated by the bone-conduction sensor 74 has a restricted frequency range. In addition, a typical bone-conduction sensor is prone to picking up contact noise (for example resulting from the wearer's head turning, or from contact with other objects). Further, it has been found that in general voiced speech is transmitted more efficiently via bone conduction than unvoiced speech.

Figure 5:
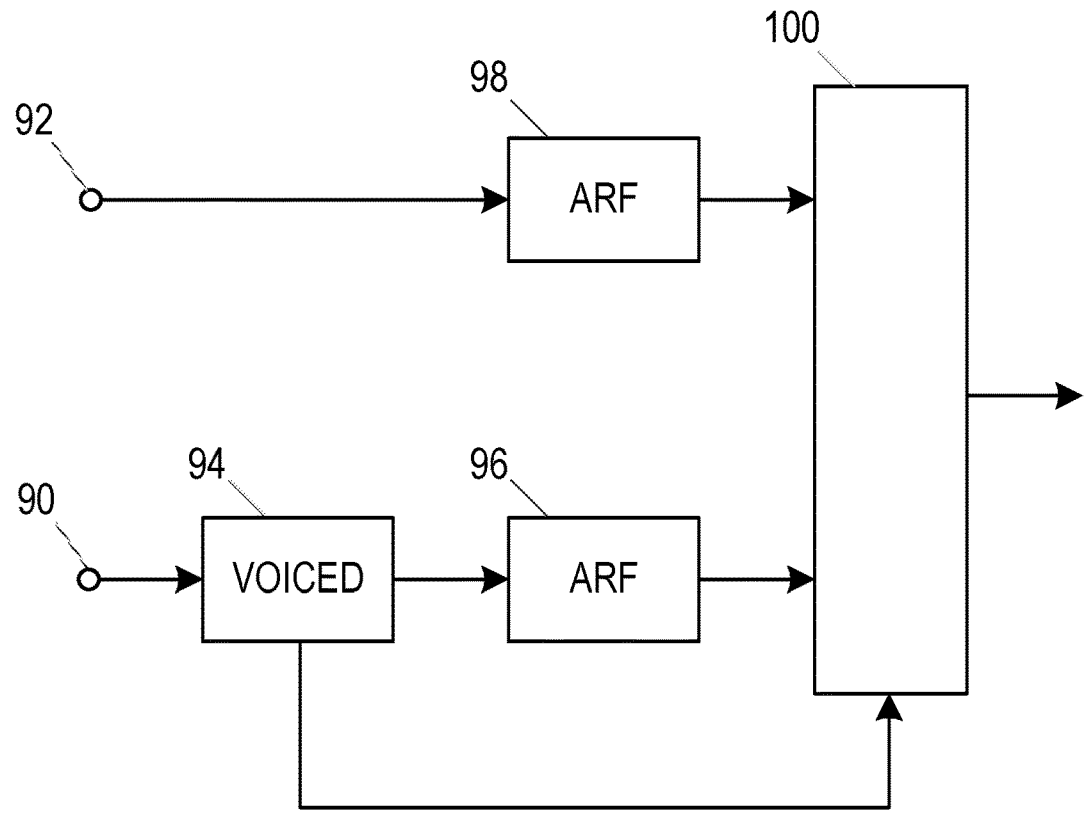
FIG. 5 is a block diagram, illustrating a part of a system as described herein.

FIG. 5 therefore shows filter circuitry for filtering the signals generated by the microphone 72 and the bone-conduction sensor 74 to make them more useful for the purposes of own voice detection.

Specifically, FIG. 5 shows the signal from the microphone 72 (i.e. the first signal mentioned at step 50 of FIG. 3) being received at a first input 90, and the signal from the bone-conduction sensor 74 (i.e. the second signal mentioned at step 52 of FIG. 3) being received at a second input 92.

As mentioned above, it may be expected that voiced speech is transmitted more efficiently via bone conduction than unvoiced speech. That being so, the second signal will be expected to contain significant signal content only during periods when the wearer's speech contains voiced speech.

Therefore, the first signal, received at the first input 90, is passed to a voiced speech detection block 94. This generates a flag when it is determined that the first signal represents voiced speech.

Voiced speech can be identified, for example, by: using a deep neural network (DNN), trained against a golden reference, for example using Praat software; performing an autocorrelation with unit delay on the speech signal (because voiced speech has a higher autocorrelation for non-zero lags); performing a linear predictive coding (LPC) analysis (because the initial reflection coefficient is a good indicator of voiced speech); looking at the zero-crossing rate of the speech signal (because unvoiced speech has a higher zero-crossing rate); looking at the short term energy of the signal (which tends to be higher for voiced speech); tracking the first formant frequency F0 (because unvoiced speech does not contain the first format frequency); examining the error in a linear predictive coding (LPC) analysis (because the LPC prediction error is lower for voiced speech); using automatic speech recognition to identify the words being spoken and hence the division of the speech into voiced and unvoiced speech; or fusing any or all of the above.

In step 54 of the method of FIG. 3, the first signal is filtered to obtain a component of the first signal at a speech articulation rate. Therefore, the first signal, received at the first input 90, is passed to a first articulation rate filter 96.

In step 56 of the method of FIG. 3, the second signal is filtered to obtain a component of the second signal at a speech articulation rate. Therefore, the second signal, received at the second input 92, is passed to a second articulation rate filter 98.

Figure 6:
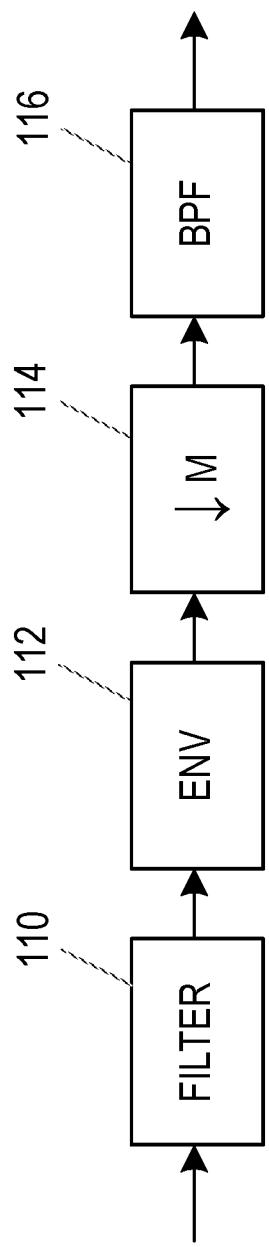
FIG. 6 is a block diagram, illustrating a part of the system of FIG. 5.

FIG. 6 is a schematic diagram, illustrating in more detail the form of the first articulation rate filter 96 and the second articulation rate filter 98.

In each case, the respective input signal is passed to a low pass filter 110, with a cut-off frequency that may for example be in the region of 1 kHz. the low-pass filtered signal is passed to an envelope detector 112 for detecting the envelope of the filtered signal. The resulting envelope signal may optionally be passed to a decimator 114, and then to a band-pass filter 116, which is tuned to allow signals at typical articulation rates to pass. For example, the band-pass filter 116 may have a pass band between 5-15 Hz or between 5-10 Hz.

Thus, the articulation rate filters 96, 98 detect the power modulating at frequencies that correspond to typical articulation rates for speech, where the articulation rate is the rate at which the speaker is speaking, which may for example be measured as the rate at which the speaker generates distinct speech sounds, or phones.

In step 58 of the method of FIG. 3, the component of the first signal at the speech articulation rate and the component of the second signal at the speech articulation rate are compared. Thus, as shown in FIG. 5, the outputs of the first articulation rate filter 96 and the second articulation rate filter 98 are passed to a comparison and decision block 100.

In step 60 of the method of FIG. 3, it is then determined that the speech has not been generated by the user wearing the wearable device, if a difference between the component of the first signal at the speech articulation rate and the component of the second signal at the speech articulation rate exceeds a threshold value. Conversely, if the difference between the component of the first signal at the speech articulation rate and the component of the second signal at the speech articulation rate does not exceed the threshold value, it may be determined that the speech has been generated by the user wearing the wearable device.

More specifically, in embodiments comprising the voiced speech detection block 94, the comparison may be performed only when the flag is generated, indicating that the first signal represents voiced speech. Either the entire filtered first signal may be passed to the comparison and decision block 100, with the comparison being performed only when the flag is generated, indicating that the first signal represents voiced speech, or unvoiced speech may be rejected and only those segments of the filtered first signal representing voiced speech may be passed to the comparison and decision block 100.

The processing of the signals detected by the first and second sensors is therefore such that, when the wearer of the wearable device is the person speaking, it would be expected that the processed version of the first signal would be similar to the processed version of the second signal. By contrast, if the wearer of the wearable device is not the person speaking, the first sensor would still be able to detect the air-conducted speech, but the second sensor would not be able to detect any bone-conducted speech, and so it would be expected that the processed version of the first signal would be quite different from the processed version of the second signal.

Figure 7:
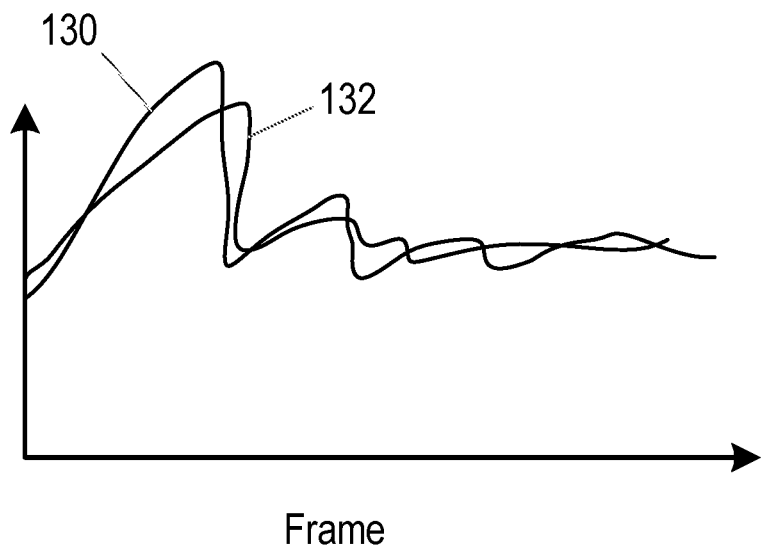
FIG. 7 illustrates a stage in the method of FIG. 3.
Figure 8:
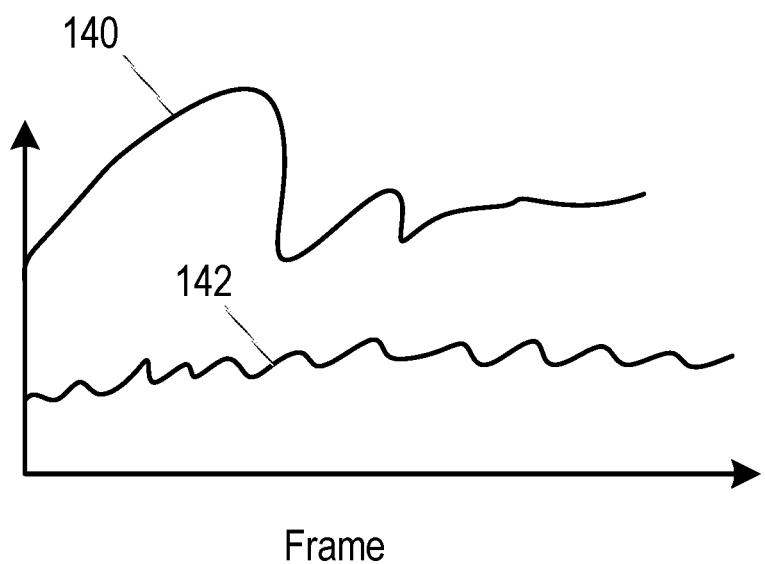
FIG. 8 further illustrates a stage in the method of FIG. 3.

FIGS. 7 and 8 are examples of this, showing the magnitudes of the processed versions of the first and second signal in these two cases. In each figure, the signals are divided into frames, having a duration of 20 ms (for example), and the magnitude during each frame period is plotted over time.

Specifically, FIG. 7 shows a situation in which the wearer of the wearable device is the person speaking, and so the processed version of the first signal 130 is similar to the processed version of the second signal 132.

By contrast, FIG. 8 shows a situation in which the wearer of the wearable device is not the person speaking, and so, while the processed version of the first signal 140 contains components resulting from the air-conducted speech, this is quite different from the processed version of the second signal 142, because this does not contain any component resulting from bone-conducted speech.

Different methods exist for performing the comparison between the component of the first signal at the speech articulation rate and the component of the second signal at the speech articulation rate, in order to determine whether a difference exceeds a threshold value.

Figure 9:
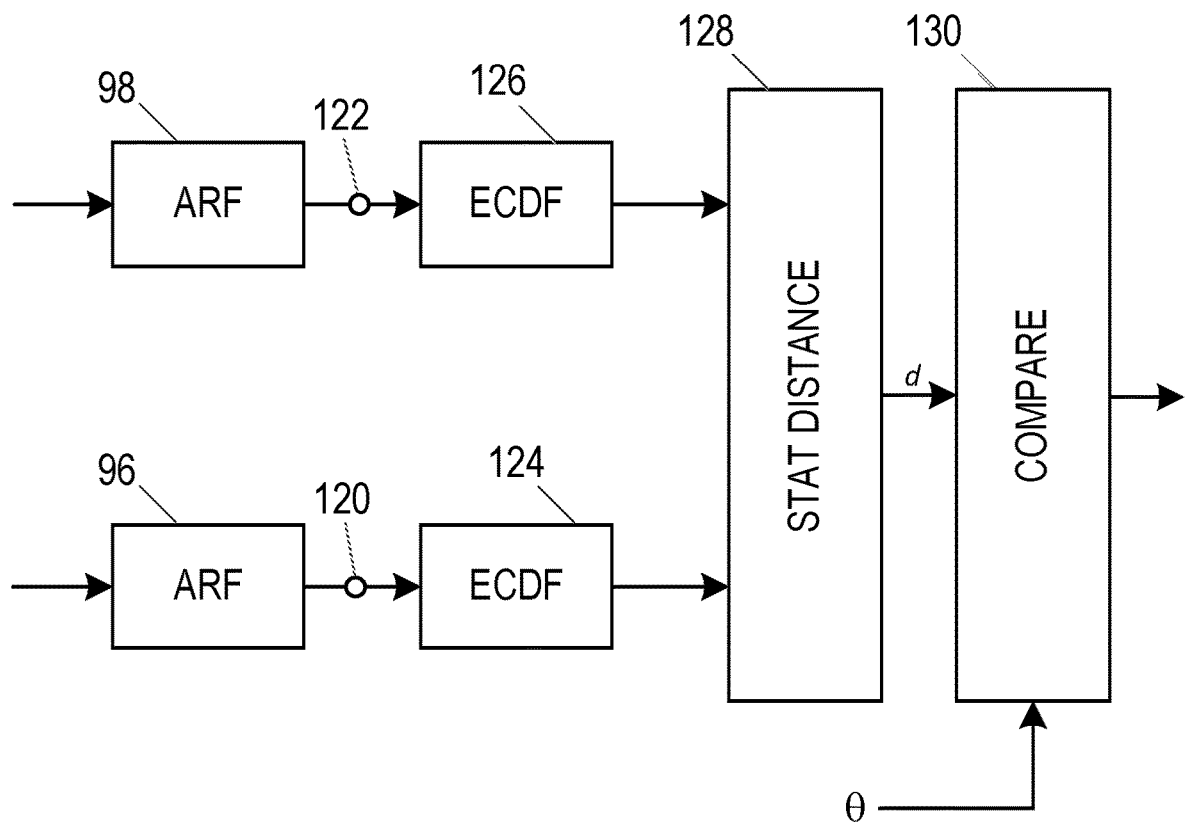
FIG. 9 is a block diagram, illustrating a form of system as described herein.

FIG. 9 is a schematic illustration, showing a first form of the comparison and decision block 100 from FIG. 5, in which the processed version of the first signal, i.e. a component of the first signal at the speech articulation rate, is generated by the first articulation rate filter 96 and passed to a first input 120 of the comparison and decision block 100. The processed version of the second signal, i.e. a component of the second signal at the speech articulation rate, is generated by the second articulation rate filter 98 and passed to a second input 122 of the comparison and decision block 100.

The signal at the first input 120 is then passed to a block 124, in which an empirical cumulative distribution function (ECDF) is formed. Similarly, the signal at the second input 122 is then passed to a block 126, in which an empirical cumulative distribution function (ECDF) is formed.

In each case, the ECDF is calculated on a frame-by-frame basis, using the magnitude of the signal during the frames. The ECDF then indicates, for each possible signal magnitude, the proportion of the frames in which the actual signal magnitude is below that level.

Figure 10:
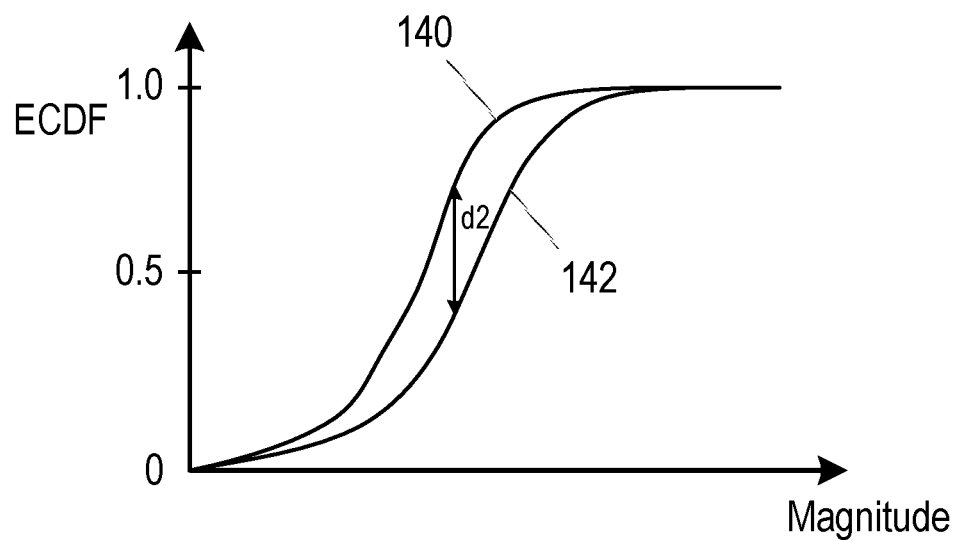
FIG. 10 illustrates a stage in the use of the system of FIG. 9.

FIG. 10 shows the two ECDFs calculated in a situation similar to FIG. 7, in which the two signals are generally similar. It can thus also be seen that the two ECDFs, namely the ECDF 142 formed from the first signal and the ECDF 140 formed from the second signal, are generally similar.

One measure of similarity between two ECDFs 142, 140 is to measure the maximum vertical distance between them, in this case d1. Alternatively, several measures of the vertical distance between the two ECDFs can be made, and then summed or averaged, in order to arrive at a suitable measure.

Figure 11:
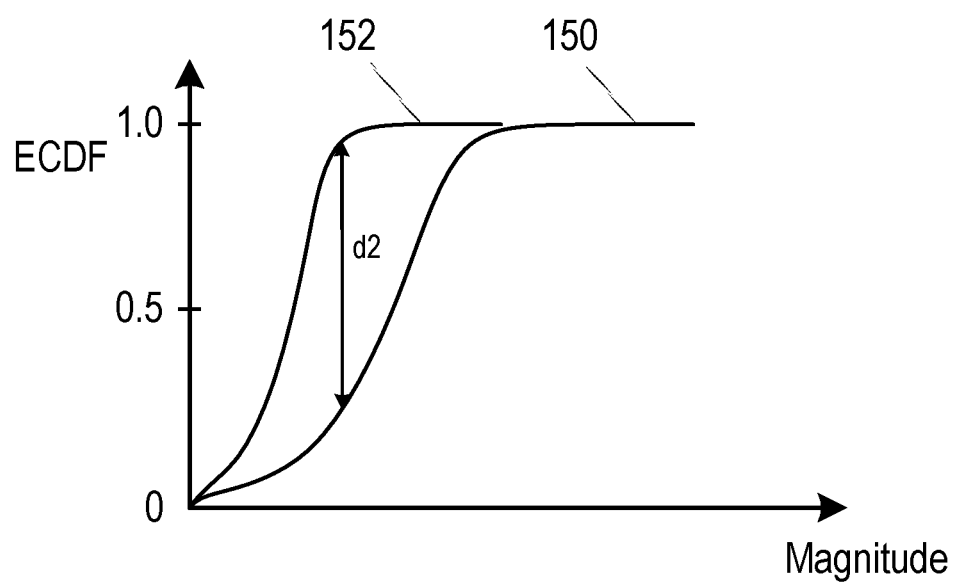
FIG. 11 illustrates a stage in the use of the system of FIG. 9.

FIG. 11 shows the two ECDFs calculated in a situation similar to FIG. 8, in which the two signals are substantially different. It can thus also be seen that the two ECDFs, namely the ECDF 152 formed from the first signal and the ECDF 150 formed from the second signal, are substantially different. Specifically, because the second signal does not contain any component resulting from bone-conducted speech, it is generally at a much lower level than the first signal, and so the form of the ECDF shows that the magnitude of the second signal is generally low.

In this case, the maximum vertical distance between the ECDFs 152, 150 is d2.

More generally, the step of comparing the components of the first and second signals at the speech articulation rate may comprise forming respective first and second distribution functions from those components, and calculating a value of a statistical distance between the second distribution function and the first distribution function.

For example, as mentioned above, the value of the statistical distance between the second distribution function and the first distribution function may be calculated as:

$$d_{KS} = \max\{|F1-F2|\}$$

where
F1 is the first distribution function and
F2 is the second distribution function, and hence
|F1−F2| is the vertical distance between the two functions at a given frequency.

Alternatively, the value of the statistical distance between the second distribution function and the first distribution function may be calculated as:

$$d_{IN} = \int |F1-F2| df$$

where
F1 is the first distribution function and
F2 is the second distribution function, and hence
|F1−F2| is the vertical distance between the two functions at a given frequency.

Alternatively, the value of the statistical distance between the second distribution function and the first distribution function may be calculated as:

$$d_{CVM} = \sqrt[p]{\int (F1-F2)^p df}$$

or, more specifically, when p=2:

$$d_{CVM} = \sqrt{\int (F1-F2)^2 df}$$

where
F1 is the first distribution function and
F2 is the second distribution function, and hence
|F1−F2| is the vertical distance between the two functions at a given frequency.

In other examples, the step of comparing the components may use a machine learning system that has been trained to distinguish between the components that are generated from a wearer's own speech and the speech of a non-wearer.

Although examples are given here in which the distribution functions are cumulative distribution functions, other distribution functions, such as probability distribution functions may be used, with appropriate methods for comparing these functions. The methods for comparing may include using machine learning systems as described above.

Thus, returning to FIG. 9, the ECDFs are passed to a block 128, which calculates the statistical distance d between the ECDFs, and passes this to a block 130, where this is compared with a threshold θ.

As discussed with reference to step 60 of the method of FIG. 3, it is then determined that the speech has not been generated by the user wearing the wearable device, if the statistical distance between the ECDFs generated from the component of the first signal at the speech articulation rate and the component of the second signal at the speech articulation rate exceeds the threshold value θ. Conversely, if the statistical distance between the ECDFs generated from the component of the first signal at the speech articulation rate and the component of the second signal at the speech articulation rate does not exceed the threshold value θ, it may be determined that the speech has been generated by the user wearing the wearable device.

Figure 12:
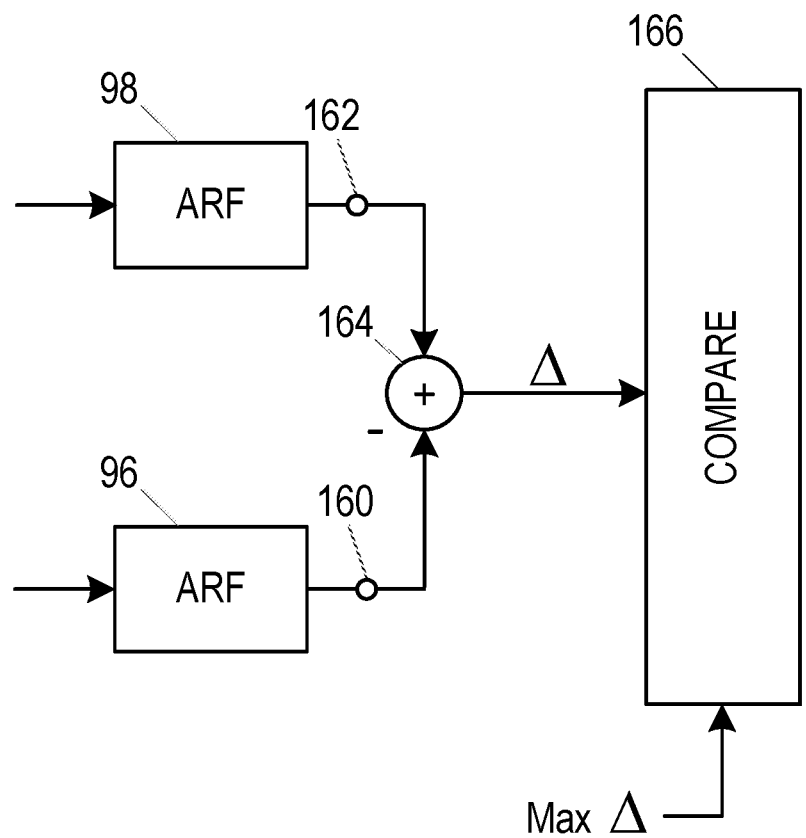
FIG. 12 is a block diagram, illustrating an alternative form of system as described herein.

FIG. 12 is a schematic illustration, showing a second form of the comparison and decision block 100 from FIG. 5, in which the processed version of the first signal, i.e. a component of the first signal at the speech articulation rate, is generated by the first articulation rate filter 96 and passed to a first input 160 of the comparison and decision block 100. The processed version of the second signal, i.e. a component of the second signal at the speech articulation rate, is generated by the second articulation rate filter 98 and passed to a second input 162 of the comparison and decision block 100.

The signal at the first input 160 is subtracted from the signal at the second input 162 in a subtractor 164, and the difference Δ is passed to a comparison block 166. In some embodiments, the value of the difference Δ, that is calculated in each frame, is compared with a threshold value. If the difference exceeds the threshold value in any frame, then it may be determined that the speech has not been generated by the user wearing the wearable device. In other embodiments, the values of the difference Δ, calculated in multiple frames, are analysed statistically. For example, the mean value of Δ, calculated over a block of, say, 20 frames, or the running mean, may be compared with the threshold value. As another example, the median value of A, calculated over a block of frames, may be compared with the threshold value. In any of these cases, if the parameter calculated from the separate difference values exceeds the threshold value, then it may be determined that the speech (or at least the relevant part of the speech from which the difference values were calculated) was not generated by the user wearing the wearable device.

FIG. 13 is a block schematic diagram of a system using the method of own speech detection described previously.

Specifically, FIG. 13 shows a first sensor 200 and a second sensor 202, which may be provided on a wearable device. As described with reference to FIG. 4, the first sensor 200 may take the form of a microphone that detects acoustic signals transmitted through the air, while the second sensor 202 may take the form of an accelerometer for detecting signals transmitted by bone-conduction (including transmission through the wearer's soft tissues).

The signals from the first sensor 200 and a second sensor 202 are passed to a wear detection block 204, which compares the signals generated by the sensors, and determines whether the wearable device is being worn at that time. For example, when the wearable device is an earphone, the wear detection block 204 may take the form of an in-ear detection block. In the case of an earphone, for example as shown in FIG. 4, the signals detected by the sensors 200 and 202 are substantially the same if the earphone is out of the user's ear, but are significantly different if the earphone is being worn. Therefore, comparing the signals allows a determination as to whether the wearable device is being worn.

Other systems are available for detecting whether a wearable device is being worn, and these may or may not use either of the sensors 200, 202. For example, optical sensors, conductivity sensors, or proximity sensors may be used.

In addition, the wear detection block 204 may be configured to perform "liveness detection", that is, to determine whether the wearable device is being worn by a live person at that time. For example, the signal generated by the second sensor 202 may be analysed to detect evidence of a wearer's pulse, to confirm that a wearable device such as an earphone or watch is being worn by a person, rather than being placed in or on an inanimate object.

When the method is used for detecting whether a person holding a handheld device such as a mobile phone is the person speaking, the detection block 204 may be configured for determining whether the device is being held by the user (as opposed to, for example, being used while lying on a table or other surface). For example, the detection block may receive signals from the sensor 202, or from one or more separate sensor, that can be used to determine whether the device is being held by the user and/or being pressed against the user's head. Again, for example, optical sensors, conductivity sensors, or proximity sensors may be used.

If it is determined that the wearable device is being worn, or the handheld device is being held, a signal from the detection block 204 is used to close switches 206, 208, and the signals from the sensors 200, 202 are passed to the inputs 90, 92 of the circuitry shown in FIG. 5.

As described with reference to FIG. 5, the comparison and decision block 100 generates an output signal indicating whether the detected speech was spoken by the person wearing the wearable device.

In this example system, the signal from the first sensor 200 is also passed to a voice keyword detection block 220. The voice keyword detection block 220 detects a particular "wake phrase" that is used by a user of the device to wake it from a low power standby mode, and put it into a mode in which speech recognition is possible.

When the voice keyword detection block 220 detects the particular "wake phrase", the signal from the first sensor 200 is sent to a speaker recognition block 222.

If the output signal from the comparison and decision block 100 indicates that the detected speech was not spoken by the person wearing the wearable device, this is considered to be a spoof, and so it is not desirable to perform speech recognition on the detected speech.

However, if the output signal from the comparison and decision block 100 indicates that the detected speech was spoken by the person wearing the wearable device, a speaker recognition process may be performed by the speaker recognition block 222 on the signal from the first sensor 200. In general terms, the process of speaker recognition extracts features from the speech signal, and compares them with features of a model generated by enrolling a known user into the speaker recognition system. If the comparison finds that the features of the speech are sufficiently similar to the model, then it is determined that the speaker is the enrolled user, to a sufficiently high degree of probability.

When the wearable device is an earphone, the process of speaker recognition may be omitted and replaced by an ear biometric process, in which the wearer of the earphone is identified. For example, this may be done by examining signals generated by an in-ear microphone provided on the earphone (which microphone may also act as the second sensor 202), and comparing features of the signals with an acoustic model of an enrolled user's ear. If it can be determined with sufficient confidence for the relevant application both that the earphone is being worn by the enrolled user, and also that the speech is the speech of the person wearing the earphone, then this acts as a form of speaker recognition.

If it is determined that the speaker is the enrolled user (either by way of an output from the speaker recognition block 222, or by using confirmation that the wearable device is being worn by the enrolled user), a signal is sent to a speech recognition block 224, which also receives the signal from the first sensor 200.

The speech recognition block 224 then performs a process of speech recognition on the received signal. If it detects that the speech contains a command, for example, it may send an output signal to a further application to act on that command.

Thus, the availability of a bone-conducted signal can be used for the purposes of own speech detection. Further, the result of the own speech detection can be used to improve the reliability of speaker recognition and speech recognition systems.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of own voice detection for a user of a device, the method comprising:

detecting a first signal representing air-conducted speech using a first microphone of the device;

detecting a second signal representing bone-conducted speech using a bone-conduction sensor of the device;

filtering the first signal to obtain a component of the first signal at a speech articulation rate;

filtering the second signal to obtain a component of the second signal at the speech articulation rate;

comparing the component of the first signal at the speech articulation rate and the component of the second signal at the speech articulation rate; and determining that the speech has not been generated by the user of the device, if a difference between the component of the first signal at the speech articulation rate and the component of the second signal at the speech articulation rate exceeds a threshold value;

wherein comparing the component of the first signal at the speech articulation rate and the component of the second signal at the speech articulation rate comprises:

subtracting the component of the second signal at the speech articulation rate from the component of the first signal at the speech articulation rate; and wherein determining that the speech has not been generated by the user of the device, if a difference between the component of the first signal at the speech articulation rate and the component of the second signal at the speech articulation rate exceeds a threshold value, comprises determining that the speech has not been generated by the user of the device, if a result of subtracting the component of the second signal at the speech articulation rate from the component of the first signal at the speech articulation rate exceeds a threshold value.

2. A method according to claim 1, comprising:

detecting signal components representing voiced speech in the first signal; and comparing the component of the first signal at the speech articulation rate and the component of the second signal at the speech articulation rate only during periods when signal components representing voiced speech are present in the first signal.

3. A method according to claim 1, comprising:

filtering the first signal in a first bandpass filter to obtain the component of the first signal at the speech articulation rate; and filtering the second signal in a second bandpass filter to obtain the component of the second signal at the speech articulation rate;

wherein the first bandpass filter and the second bandpass filter have respective pass bands that include the frequency range from 5-15 Hz.

4. A method according to claim 3, further comprising, before filtering the first signal in the first bandpass filter and filtering the second signal in the second bandpass filter, low pass filtering the first signal and the second signal, and detecting an envelope of each filtered signal.

5. A method according to claim 1, wherein:

comparing the component of the first signal at the speech articulation rate and the component of the second signal at the speech articulation rate comprises:

forming a Cumulative Distribution Function of the component of the first signal at the speech articulation rate;

forming a Cumulative Distribution Function of the component of the second signal at the speech articulation rate; and determining a difference between the Cumulative Distribution Function of the component of the first signal at the speech articulation rate and the Cumulative Distribution Function of the component of the second signal at the speech articulation rate;

wherein determining that the speech has not been generated by the user of the device, if a difference between the component of the first signal at the speech articulation rate and the component of the second signal at the speech articulation rate exceeds a threshold value, comprises determining that the speech has not been generated by the user of the device, if the difference between the Cumulative Distribution Function of the component of the first signal at the speech articulation rate and the Cumulative Distribution Function of the component of the second signal at the speech articulation rate exceeds a threshold value.

6. A method according to claim 5, comprising:
obtaining the component of the first signal at the speech articulation rate and the component of the second signal at the speech articulation rate in each of a plurality of frames; and
forming said Cumulative Distribution Functions on a frame-by-frame basis, using the magnitude of the respective signal during a plurality of said frames.

7. A method according to claim 1, comprising:
obtaining the component of the first signal at the speech articulation rate and the component of the second signal at the speech articulation rate in each of a plurality of frames;
subtracting the component of the second signal at the speech articulation rate from the component of the first signal at the speech articulation rate on a frame-by-frame basis; and
forming the result of subtracting the component of the second signal at the speech articulation rate from the component of the first signal at the speech articulation rate from a plurality of values calculated on a frame-by-frame basis.

8. A method according to claim 1, wherein the device is a wearable device, and the user of the device is a wearer of the device.

9. A method according to claim 8, wherein the wearable device is an earphone, smart glasses, or a smart watch.

10. A method according to claim 1, wherein the device is a handheld device.

11. A method according to claim 10, wherein the handheld device is a mobile phone.

12. A system, for own voice detection for a user of a device, the system comprising:
an input for receiving a first signal representing air-conducted speech from a first microphone of the device and a second signal representing bone-conducted speech from a bone-conduction sensor of the device;
at least one filter for filtering the first signal to obtain a component of the first signal at a speech articulation rate and for filtering the second signal to obtain a component of the second signal at the speech articulation rate;
a comparator for comparing the component of the first signal at the speech articulation rate and the component of the second signal at the speech articulation rate; and
a processor for determining that the speech has not been generated by the user of the device, if a difference between the component of the first signal at the speech articulation rate and the component of the second signal at the speech articulation rate exceeds a threshold value;

wherein comparing the component of the first signal at the speech articulation rate and the component of the second signal at the speech articulation rate comprises:
subtracting the component of the second signal at the speech articulation rate from the component of the first signal at the speech articulation rate; and
wherein determining that the speech has not been generated by the user of the device, if a difference between the component of the first signal at the speech articulation rate and the component of the second signal at the speech articulation rate exceeds a threshold value, comprises determining that the speech has not been generated by the user of the device, if a result of subtracting the component of the second signal at the speech articulation rate from the component of the first signal at the speech articulation rate exceeds a threshold value.

13. A system according to claim 12, comprising:
wherein the at least one filter comprises at least one bandpass filter for filtering the first signal and filtering the second signal; and
wherein the at least one bandpass filter has a pass band that includes the frequency range from 5-15 Hz.

14. A system according to claim 13, wherein the at least one filter comprises:
at least one low pass filter, for low pass filtering the first signal and the second signal, before filtering the first signal and the second signal in the at least one bandpass filter, and
an envelope detector, for detecting an envelope of each filtered signal.

15. A system according to claim 12, wherein the device is a wearable device, and the user of the device is a wearer of the device, and wherein the system is implemented in a device separate from said wearable device.

16. A system according to claim 15, wherein the wearable device is an earphone, smart glasses, or a smart watch.

17. A system according to claim 12, wherein the device is a handheld device, and the system is implemented in said device.

18. A system according to claim 17, wherein the handheld device is a mobile phone.

19. A speaker recognition system, comprising:
an input for receiving a first signal representing air-conducted speech from a first microphone of a device and a second signal representing bone-conducted speech from a bone-conduction sensor of the device;
at least one filter for filtering the first signal to obtain a component of the first signal at a speech articulation rate, and for filtering the second signal to obtain a component of the second signal at the speech articulation rate;
a comparator, for comparing the component of the first signal at the speech articulation rate and the component of the second signal at the speech articulation rate;
a processor for determining that the speech has not been generated by a user of the device, if a difference between the component of the first signal at the speech articulation rate and the component of the second signal at the speech articulation rate exceeds a threshold value; and
a speaker recognition block, for performing speaker recognition on the first signal representing speech, if the difference between the component of the first signal at the articulation rate and the component of the second signal at the articulation rate does not exceed the threshold value;

wherein comparing the component of the first signal at the speech articulation rate and the component of the second signal at the speech articulation rate comprises: subtracting the component of the second signal at the speech articulation rate from the component of the first signal at the speech articulation rate; and wherein determining that the speech has not been generated by the user of the device, if a difference between the component of the first signal at the speech articulation rate and the component of the second signal at the speech articulation rate exceeds a threshold value, comprises determining that the speech has not been generated by the user of the device, if a result of subtracting the component of the second signal at the speech articulation rate from the component of the first signal at the speech articulation rate exceeds a threshold value.

20. A method of own voice detection for a user of a device, the method comprising:

detecting a first signal representing air-conducted speech using a first microphone of the device;

detecting a second signal representing bone-conducted speech using a bone-conduction sensor of the device;

filtering the first signal to obtain a component of the first signal at a speech articulation rate;

filtering the second signal to obtain a component of the second signal at the speech articulation rate;

comparing the component of the first signal at the speech articulation rate and the component of the second signal at the speech articulation rate by:

forming a Cumulative Distribution Function of the component of the first signal at the speech articulation rate;

forming a Cumulative Distribution Function of the component of the second signal at the speech articulation rate; and determining a difference between the Cumulative Distribution Function of the component of the first signal at the speech articulation rate and the Cumulative Distribution Function of the component of the second signal at the speech articulation rate; and determining that the speech has not been generated by the user of the device, if the difference between the Cumulative Distribution Function of the component of the first signal at the speech articulation rate and the Cumulative Distribution Function of the component of the second signal at the speech articulation rate exceeds a threshold value.

* * * * *